United States Patent
Tanaka et al.

(10) Patent No.: US 10,320,265 B2
(45) Date of Patent: *Jun. 11, 2019

(54) WIPER MOTOR

(71) Applicant: Mitsuba Corporation, Gunma (JP)

(72) Inventors: Hiroto Tanaka, Gunma (JP); Takeshi Kanai, Gunma (JP); Masaaki Kimura, Gunma (JP); Koji Tsuchiya, Gunma (JP); Hiroji Okabe, Gunma (JP); Toshiyuki Amagasa, Gunma (JP); Hachidai Watanabe, Gunma (JP)

(73) Assignee: Mitsuba Corporation, Kiryu-shi, Gunma (JP)

( * ) Notice: Subject to any disclaimer, the term of this patent is extended or adjusted under 35 U.S.C. 154(b) by 337 days.

This patent is subject to a terminal disclaimer.

(21) Appl. No.: 15/337,131

(22) Filed: Oct. 28, 2016

(65) Prior Publication Data

US 2017/0047817 A1 Feb. 16, 2017

Related U.S. Application Data

(63) Continuation-in-part of application No. 14/638,502, filed on Mar. 4, 2015, now Pat. No. 9,979,261, which
(Continued)

(30) Foreign Application Priority Data

Jul. 30, 2009 (JP) .................. 2009-178154

(51) Int. Cl.
*H02K 11/21* (2016.01)
*H02K 7/116* (2006.01)
(Continued)

(52) U.S. Cl.
CPC .............. *H02K 7/1166* (2013.01); *B60S 1/08* (2013.01); *B60S 1/26* (2013.01); *F16H 1/16* (2013.01);
(Continued)

(58) Field of Classification Search
CPC ........ H02K 11/21; H02K 11/33; H02K 11/38; H02K 11/215; H02K 7/1166
See application file for complete search history.

(56) References Cited

U.S. PATENT DOCUMENTS

| 6,218,755 B1 | 4/2001 | Tanaka et al. |
| 6,452,297 B2 | 9/2002 | Yamamoto et al. |

(Continued)

FOREIGN PATENT DOCUMENTS

| CN | 202364062 U | 8/2012 |
| DE | 101 53 173 A1 | 10/2002 |

(Continued)

OTHER PUBLICATIONS

Extended European Search Report for EP10804375 dated May 24, 2017.

*Primary Examiner* — Dang D Le
(74) *Attorney, Agent, or Firm* — McCormick, Paulding & Huber LLP

(57) ABSTRACT

A wiper motor has: a magnet disposed on the yoke and formed with at least four poles; an armature disposed on an inner side of the magnet; a speed reduction mechanism unit having an output shaft for transmitting the rotation of the armature shaft; a gear housing connected to the yoke; a gear housing cover covering an opening of the gear housing; a magnet attached to the output shaft of the speed reduction mechanism unit; an absolute position detecting sensor disposed so as to face the magnet; and a control board having the absolute position detecting sensor attached thereto, the control board being disposed between the gear housing and the gear housing cover, and configured to control the rotation of the armature shaft.

20 Claims, 14 Drawing Sheets

Related U.S. Application Data is a continuation of application No. 13/387,560, filed as application No. PCT/JP2010/062544 on Jul. 26, 2010, now Pat. No. 9,000,634, application No. 15/337,131, filed on Oct. 28, 2016, which is a continuation-in-part of application No. 14/357,816, filed as application No. PCT/JP2011/076927 on Nov. 22, 2011, now Pat. No. 9,525,322.

(51) Int. Cl.

| | | |
|---|---|---|
| H02K 5/14 | (2006.01) | |
| H02K 11/215 | (2016.01) | |
| H02K 11/33 | (2016.01) | |
| H02K 11/38 | (2016.01) | |
| H02K 9/22 | (2006.01) | |
| H02K 9/28 | (2006.01) | |
| H02K 13/00 | (2006.01) | |
| F16H 57/039 | (2012.01) | |
| F16H 1/16 | (2006.01) | |
| F16H 57/04 | (2010.01) | |
| B60S 1/08 | (2006.01) | |
| B60S 1/26 | (2006.01) | |
| H02K 5/18 | (2006.01) | |
| H02K 5/06 | (2006.01) | |
| F16H 57/02 | (2012.01) | |

(52) U.S. Cl.
CPC ....... *F16H 57/039* (2013.01); *F16H 57/0412* (2013.01); *F16H 57/0476* (2013.01); *F16H 57/0498* (2013.01); *H02K 5/06* (2013.01); *H02K 5/148* (2013.01); *H02K 5/18* (2013.01); *H02K 9/22* (2013.01); *H02K 9/28* (2013.01); *H02K 11/215* (2016.01); *H02K 11/33* (2016.01); *H02K 11/38* (2016.01); *H02K 13/006* (2013.01); *F16H 2057/02034* (2013.01)

(56) References Cited

U.S. PATENT DOCUMENTS

| | | | |
|---|---|---|---|
| 6,734,589 B2 | 5/2004 | Kogure et al. | |
| 7,471,021 B2 | 12/2008 | Yagi et al. | |
| 7,714,472 B2 | 5/2010 | Kuroda | |
| 9,000,634 B2* | 4/2015 | Tanaka | H02K 5/148 310/64 |
| 9,525,322 B2* | 12/2016 | Okabe | H02K 7/1166 |
| 9,979,261 B2* | 5/2018 | Tanaka | H02K 5/148 |
| 2005/0280323 A1 | 12/2005 | Amagasa | |
| 2006/0226802 A1 | 10/2006 | Marentette | |

FOREIGN PATENT DOCUMENTS

| | | |
|---|---|---|
| DE | 10 2005 040 647 A1 | 3/2007 |
| DE | 10 2005 052 675 A1 | 5/2007 |
| DE | 10 2006 060 621 A1 | 6/2008 |
| DE | 10 2008 001 359 A1 | 10/2009 |
| DE | 10 2008 029 463 A1 | 12/2009 |
| DE | 10 2008 042 250 A1 | 4/2010 |
| DE | 10 2008 049 369 A1 | 4/2010 |
| DE | 10 2009 047 567 A1 | 5/2011 |
| FR | 2699760 A1 | 6/1994 |
| FR | 2 865 981 A1 | 8/2005 |
| JP | 2004-159392 A | 6/2004 |
| JP | 2004-320879 A | 11/2004 |
| JP | 2005-94821 A | 4/2005 |
| JP | 2005-94822 A | 4/2005 |
| JP | 2005-168133 A | 6/2005 |
| JP | 2005-176420 A | 6/2005 |
| JP | 2005-184892 A | 7/2005 |
| JP | 2006-353019 A | 12/2006 |
| JP | 2007-97352 A | 4/2007 |
| JP | 2007-124792 A | 5/2007 |
| JP | 2007116829 A | 5/2007 |
| JP | 2007-143208 A | 6/2007 |
| JP | 2007-143278 A | 6/2007 |
| JP | 2008-131800 A | 6/2008 |
| JP | 2008-148394 A | 6/2008 |
| JP | 2008-160941 A | 7/2008 |
| JP | 2008178247 A | 7/2008 |
| JP | 2008-206373 A | 9/2008 |
| JP | 2008-253049 A | 10/2008 |
| JP | 2008-253086 A | 10/2008 |
| JP | 2008-253137 A | 10/2008 |
| JP | 2008-259278 A | 10/2008 |
| JP | 2006115092 A1 | 12/2008 |
| JP | 2008290615 A | 12/2008 |
| JP | 2009033956 A | 2/2009 |
| JP | 2009-113555 A | 5/2009 |
| JP | 2009-119986 A | 6/2009 |
| JP | 2009-119987 A | 6/2009 |
| JP | 2009-119988 A | 6/2009 |
| JP | 2009-171734 A | 7/2009 |
| JP | 2009-189093 A | 8/2009 |
| JP | 2009-201176 A | 9/2009 |
| JP | 2009-201277 A | 9/2009 |
| JP | 2009-225520 A | 10/2009 |
| JP | 2010-11697 A | 1/2010 |
| JP | 2010-17078 A | 1/2010 |
| JP | 2010-22198 A | 1/2010 |
| JP | 2010-22199 A | 1/2010 |
| JP | 2010-22200 A | 1/2010 |
| JP | 2010-22201 A | 1/2010 |
| JP | 2010-35403 A | 2/2010 |
| JP | 2010-35405 A | 2/2010 |
| JP | 2010-57351 A | 3/2010 |
| JP | 2010-57352 A | 3/2010 |
| JP | 2010-93890 A | 4/2010 |
| JP | 2010-93924 A | 4/2010 |
| JP | 2010-93939 A | 4/2010 |
| JP | 2010-110111 A | 5/2010 |
| JP | 2010-110134 A | 5/2010 |
| JP | 2010-110137 A | 5/2010 |
| JP | 2010-119276 A | 5/2010 |
| JP | 2010-119283 A | 5/2010 |
| JP | 2010-141969 A | 6/2010 |
| JP | 2010-142103 A | 6/2010 |
| JP | 2010-148300 A | 7/2010 |
| JP | 2010-193643 A | 9/2010 |
| JP | 2010-193644 A | 9/2010 |
| JP | 2010-220329 A | 9/2010 |
| JP | 2010-283930 A | 12/2010 |
| JP | 2010-288383 A | 12/2010 |
| JP | 2011-35962 A | 2/2011 |
| JP | 2011-35976 A | 2/2011 |
| JP | 2011-57174 A | 3/2011 |
| JP | 2011-72053 A | 4/2011 |
| JP | 2011-193692 A | 9/2011 |
| JP | 2011-223778 A | 11/2011 |
| JP | 2011-234453 A | 11/2011 |
| JP | 2011-244562 A | 12/2011 |
| JP | 2011-250659 A | 12/2011 |
| JP | 2012-147519 A | 8/2012 |
| JP | 2012-187000 A | 9/2012 |
| JP | 2012-200145 A | 10/2012 |
| JP | 2012-200146 A | 10/2012 |
| JP | 2012-245867 A | 12/2012 |
| WO | 2007/036810 A2 | 4/2007 |
| WO | 2007/052503 A1 | 5/2007 |
| WO | 2009/119456 A1 | 10/2009 |
| WO | 2010/001899 A1 | 1/2010 |
| WO | 2010/014448 A1 | 2/2010 |
| WO | 2011/013629 A1 | 2/2011 |

* cited by examiner

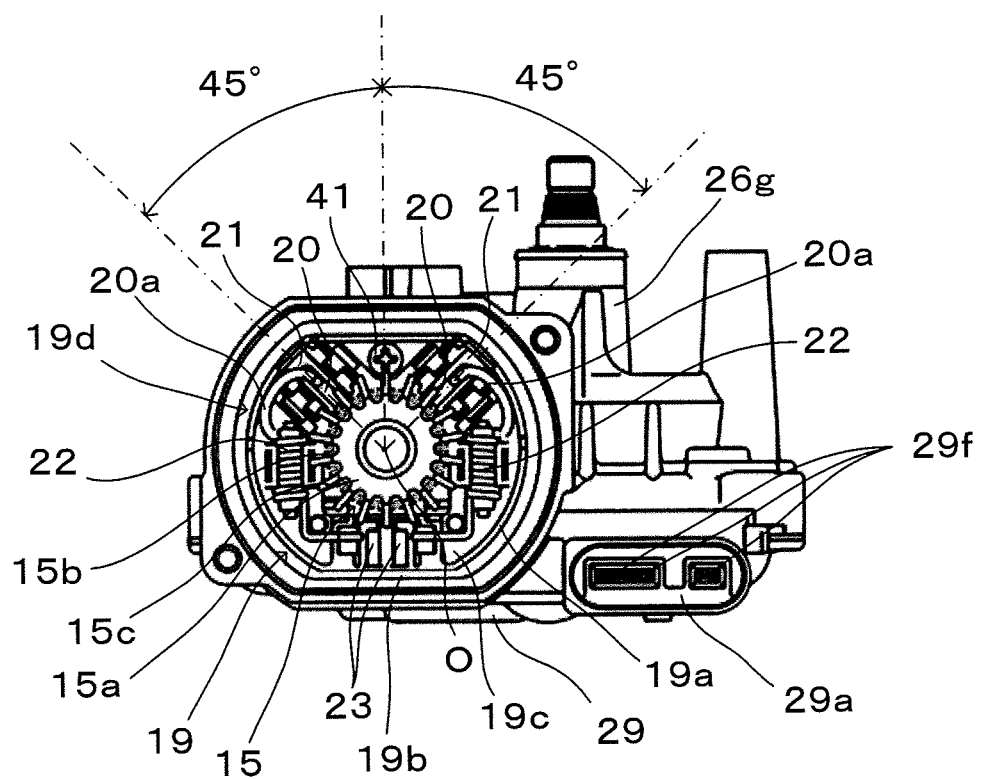

WIPER MOTOR

CROSS REFERENCE TO RELATED APPLICATIONS

This application is a continuation-in-part of U.S. patent application Ser. No. 14/638,502 filed on Mar. 4, 2015 and published as U.S. Patent Application Publication No. 2015/0180314, which is a continuation of U.S. patent application Ser. No. 13/387,560, filed on Jan. 27, 2012 and published as U.S. Patent Application Publication No. 2012/0119601, which is the National Stage filing of PCT Application No. PCT/JP2010/062544 filed on Jul. 26, 2010, which claims priority to Japanese Patent Application No. 2009-178154 filed Jul. 30, 2009, which are hereby incorporated by reference in their entirety. This application is also continuation-in-part of U.S. patent application Ser. No. 14/357,816 filed on May 13, 2014 and published as U.S. Patent Application Publication No. 2015/0180305, which is the National Stage filing of PCT Application No. PCT/JP2011/076927 filed on Nov. 22, 2011, which are hereby incorporated by reference in their entirety.

TECHNICAL FIELD

The present invention relates to a motor with speed reduction mechanism.

BACKGROUND ART

In general, in a wiper device to be mounted on a vehicle, a wiper motor with speed reduction mechanism is used as a driving source for periodically swinging a wiper arm. This wiper motor with speed reduction mechanism has: a motor unit having brushes and an armature; and a speed reduction mechanism unit for reducing the speed of rotation of the armature of the motor unit. The speed reduction mechanism unit is provided with a control device for controlling the rotation of the armature, thereby controlling a position and a speed of the wiper arm. Also, the control device is provided with a plurality of field effect transistors (hereinafter simply referred to as "FETs") as switching elements. Electric current to be supplied from a power supply to the motor unit is controlled with an ON/OFF operation of these FETs.

The FETs produce heat due to switching loss occurring at the time of this ON/OFF operation and reach high temperature when the ON/OFF operation is frequently performed. Heat generated from the FETs is transmitted together with heat from the motor unit to a control board. For this reason, on a cover of the speed reduction mechanism unit, a heat sink is provided in the vicinity of the FETs disposed on the control board of the control device, and heat generated from the FETs is dissipated by the heat sink to the outside.

However, for example, when the motor unit continuously operates, large heat is generated from the FETs and coils of the motor unit. This heat is transmitted to the control board, and we are concerned that the temperature of the control board may exceed a specified (durable) temperature. In order to get around this, a temperature detection circuit is provided on the control board, and when it is determined by the temperature detection circuit that the temperature of the control board exceeds a predetermined temperature, the temperature detection circuit is configured to cut off the electric current to be supplied from the power supply via the FETs to the motor unit. With the cutoff of the electric current, the control board is prevented from going out of order (for example, Japanese Patent Application Laid-Open Publication No. 2007-097352).

As described above, the FETs and the coil of the motor unit are a main heat source of heat to be transmitted to the control board. However, for the purpose of decreasing the size of motors, in a motor for use in a wiper device, a multipolar motor with four or more magnetic poles of a magnet has been suggested in recent years, and the brushes can also be a source of heat to be transmitted to the control board. In this multipolar motor, a distance between a brush on a ground side and a brush on a power supply side disposed in a brush accommodating part is short in some cases. As such, when the brushes on the ground side and the power supply side are close to each other, the temperature of the resin made cover provided near the brushes and integrally mounted on the speed reduction mechanism unit is increased due to heat generated at the brushes. For this reason, a temperature gradient between the cover and the speed reduction mechanism unit including the control board is increased, and the temperature of the control board is increased not only due to heat generated from the FETs and the coil of the motor unit but also due to heat generated from the brushes. And, with heat from the brushes being further added to the control board, the temperature of the control board is prone to be further increased, and the temperature of the temperature detection circuit is prone to reach a predetermined temperature, thereby posing a problem such that it is difficult to actuate the motor with speed reduction mechanism for a long period of time.

Therefore, an object of the present invention is to provide a motor with speed reduction mechanism capable of efficiently dissipating heat generated from brushes and reducing the heat transmitted to the control board from the brushes.

Additionally, in a wiper motor where the armature rotates in a forward direction and a reverse direction by using a two-pole magnet and two brushes, it is necessary to increase the thickness of the yoke on the basis of magnetic flux of the motor unit, which may increase the weight of the wiper motor, and therefore, also increase the inertia of wiper motor. Thus, there is a possibility of deteriorating the control accuracy of the wiper.

Therefore, another object of the present invention is to provide a wiper motor improved in weight and size, and improved in wiping accuracy.

SUMMARY

In order to efficiently dissipate heat and reduce the heat transmitted to the control board, a motor with speed reduction mechanism according to the present invention, comprises: a yoke having a bottom surface; a magnet formed with at least four poles in which different magnetic poles are alternately disposed on an inner peripheral surface of the yoke; an armature including an armature shaft which has one end rotatably supported by a bottom portion of the yoke, a commutator which is fixed to the armature shaft, and a core which is fixed to the armature shaft and around which a winding wire is wound, wherein the armature is rotatably disposed on an inner side of the magnet; at least two brushes slidably contacting with the commutator; brush holders on which the at least two brushes are mounted; a gear housing formed into a bottomed open shape and formed with a speed reduction mechanism accommodating part having accommodated therein a speed reduction mechanism engaged with a worm formed on the armature shaft, the gear housing being; and a gear housing cover covering the opening of the gear housing, wherein a first heat dissipating member is mounted on the gear housing, and at least said two brushes are disposed in the vicinity of the first heat dissipating member.

With this configuration, heat generated from the brushes can be transmitted to the first heat dissipating member formed in the gear housing and dissipated.

A control board on which a plurality of FETs are mounted is fixed to the gear housing cover, and a second heat dissipating member from which heat generated from the plurality of FETs is dissipated is formed on an outer peripheral surface of the gear housing near the plurality of FETs.

With this configuration, heat generated from the FETs and heat transmitted from the first heat dissipating member can be dissipated from the second heat dissipating member.

A heat conducting member is disposed between the first heat dissipating member and the brushes.

With this configuration, heat generated from the brushes can be dissipated from the first heat dissipating member via the heat conducting member.

A FET heat dissipating member is disposed between the second heat dissipating member and the FETs.

With this configuration, heat generated from the FETs can be dissipated from the second head dissipating member via the FET heat dissipating member.

The first heat dissipating member is formed into an elliptical shape in the gear housing, with paired flat surface parts and paired curved parts alternately disposed, the first heat dissipating member being formed on one flat surface part of the paired flat surface parts.

With this configuration, heat generated from the brushes can be transmitted to the first heat dissipating member disposed on one flat surface part of the paired flat surface parts of the gear housing and dissipated.

A motor with speed reduction mechanism according to the present invention comprises: a yoke with a bottom surface; a magnet having at least four poles, two different magnetic poles being alternatively disposed on an inner peripheral surface of the yoke; an armature having an armature shaft disposed on an inner side of the four pole magnet, the armature shaft having one end rotatably supported by a bottom portion of the yoke, a commutator fixed to the armature shaft and formed of a plurality of segments, and a core fixed to the armature shaft and around which a winding wire is wound, the armature being rotatably disposed on the inner side of the magnet; an armature including a winding wire part wound around the armature core and a plurality of connecting members with which paired segment parts facing each other among the plurality of segment parts are electrically connected to each other; a brush holder unit including at least two brushes in wiping contact with the commutator and disposed so as to be shifted by approximately 90 degrees from each other with respect to a center of rotation of the armature shaft and brush holders holding the brushes; and a gear housing including a speed reduction mechanism accommodating part having accommodated therein a speed reduction mechanism connected to an opening of the yoke and engaged with a worm formed on the armature shaft; and a gear housing cover on which a control board for controlling rotation of the armature is mounted, the gear housing cover covering the opening of the gear housing, a first heat dissipating member being formed in the gear housing, and the at least two brushes being disposed near the first heat dissipating member.

With this configuration, heat generated from the brushes can be transmitted to the first heat dissipating member formed in the gear housing and dissipated.

A plurality of FETs are mounted on the control board, and a second heat dissipating member from which heat generated from the plurality of FETs is dissipated is formed on an outer peripheral surface of the gear housing near the plurality of FETs.

With this configuration, heat generated from the FETs and heat transmitted from the first heat dissipating member can be dissipated from the second heat dissipating member.

A heat conducting member is disposed between the first heat dissipating member and the brushes.

With this configuration, heat generated from the brushes can be dissipated from the first heat dissipating member via the heat conducting member.

A FET heat dissipating member is disposed between the second heat dissipating member and the FETs.

With this configuration, heat generated from the FETs can be dissipated from the second heat dissipating member via the FET heat dissipating member.

The first heat dissipating member is formed into an elliptical shape in the gear housing, with paired flat surface parts and paired curved parts alternately disposed, the first heat dissipating member being formed on one flat surface part of the paired flat surface parts.

With this configuration, heat generated from the brushes can be transmitted to the first heat dissipating member disposed on one flat surface part of the paired flat surface parts of the gear housing and dissipated.

A motor with speed reduction mechanism according to the present invention comprises: a yoke with a bottom surface; a magnet formed of at least four poles so that different magnetic poles are alternately disposed on an inner peripheral surface of the yoke; an armature having an armature shaft having one end rotatably supported by a bottom portion of the yoke, a commutator fixed to the armature shaft and formed of a plurality of segments, and a core fixed to the armature shaft and around which a winding wire is wound, the armature being rotatably disposed on the inner side of the magnet; at least two brushes slidably contacting with the commutator; brush holders on which the at least two brushes are mounted; a gear housing having a speed reduction mechanism accommodating part having accommodated therein a speed reduction mechanism engaged with a worm formed on the armature shaft, the gear housing formed into a shape with a bottom surface and an opening; and a gear housing cover covering the opening of the gear housing, two electrical conducting members formed so as to protrude toward the gear housing and electrically connected to the brushes being fixed to the gear housing cover, a brush terminal connecting part to which the two electrical conducting members are each electrically connected being formed in the brush holders, and a first heat dissipating member being formed in the gear housing so as to be separated from the brush terminal connecting part.

With this configuration, heat generated from the brushes can be transmitted to the first heat dissipating member formed in the gear housing and dissipated.

A control board on which a plurality of FETs are mounted is fixed to the gear housing cover, and a second heat dissipating member from which heat generated from the plurality of FETs is dissipated is formed on an outer peripheral surface of the gear housing near the plurality of FETs.

With this configuration, heat generated from the FETs and heat transmitted from the first heat dissipating member can be dissipated from the second heat dissipating member.

A heat conducting member is disposed between the first heat dissipating member and the brushes.

With this configuration, heat generated from the brushes can be dissipated from the first heat dissipating member via the heat conducting member.

A FET heat dissipating member is disposed between the second heat dissipating member and the FETs.

With this configuration, heat generated from the FETs can be dissipated from the second heat dissipating member via the FET heat dissipating member.

The first heat dissipating member is formed into an elliptical shape in the gear housing, with paired flat surface parts and paired curved parts alternately disposed, the first heat dissipating member being formed on one flat surface part of the paired flat surface parts.

With this configuration, heat generated from the brushes can be transmitted to the first heat dissipating member disposed on one flat surface part of the paired flat surface parts of the gear housing and dissipated.

According to the present invention, heat generated from the brushes can be dissipated from the first heat dissipating member disposed on the gear housing. Therefore, heat is less prone to be transmitted to the control board, and the temperature of the temperature detection circuit is less prone to reach a predetermined temperature, thereby allowing the wiper motor to be actuated for a long time.

Additionally, in order to reduce weight and size, and improve wiping accuracy, a wiper motor according to the present invention comprises: a yoke; a magnet formed with at least four poles in which different magnetic poles are alternately disposed on an inner peripheral surface of the yoke; an armature including an armature shaft which has one end rotatably supported by a bottom portion of the yoke, a commutator which is fixed to the armature shaft, and a core which is fixed to the armature shaft and around which a winding wire is wound, wherein the armature is rotatably disposed on an inner side of the magnet; two brushes slidably contacting with the commutator, the brushes being disposed so as to be spaced apart from each other at intervals of 90 degrees; a speed reduction mechanism unit having an output shaft for transmitting the rotation of the armature shaft by meshing with a worm formed on the armature shaft; a gear housing connected to the yoke, the gear housing being formed with a speed reduction mechanism accommodating part having accommodated therein the speed reduction mechanism unit, and formed into a bottomed open shape; a gear housing cover covering an opening of the gear housing; a magnet attached to the output shaft; an absolute position detecting sensor disposed so as to face the magnet; and a control board having the absolute position detecting sensor attached thereto, the control board being disposed between the gear housing and the gear housing cover, and configured to control the rotation of the armature shaft.

Furthermore, a wiper motor according to the present invention comprises: a case; a magnet formed with at least four poles in which different magnetic poles are alternately disposed on an inner peripheral surface of the case; an armature including an armature shaft which is rotatably supported by the case, a commutator which is fixed to the armature shaft, and a core which is fixed to the armature shaft and around which a winding wire is wound, wherein the armature is rotatably disposed on an inner side of the magnet; two brushes slidably contacting with the commutator, the brushes being disposed so as to be spaced apart from each other at intervals of 90 degrees; a speed reduction mechanism unit accommodated in the case, the speed reduction mechanism unit having an output shaft meshing with a worm formed on the armature shaft to transmit the rotation of the armature shaft; a magnet attached to the output shaft; an absolute position detecting sensor disposed so as to face the magnet; and a control board having the absolute position detecting sensor attached thereto, the control board being accommodated in the case, and configured to control the rotation of the armature shaft.

Furthermore, in the present invention, the output shaft is formed with a fixing part to which a swinging member is directly or indirectly fixed.

According to the present invention, a wiper motor, which has an armature that rotates in a forward direction and a reverse direction by using a two-pole magnet and two brushes, the wiper motor is provided with an angle sensor to improve its weight and size, and improve wiping accuracy.

BRIEF DESCRIPTION OF THE DRAWINGS

FIG. 4A is a view of a state in which a motor unit is removed from the wiper motor with speed reduction mechanism;

DETAILED DESCRIPTION

Figure 1:
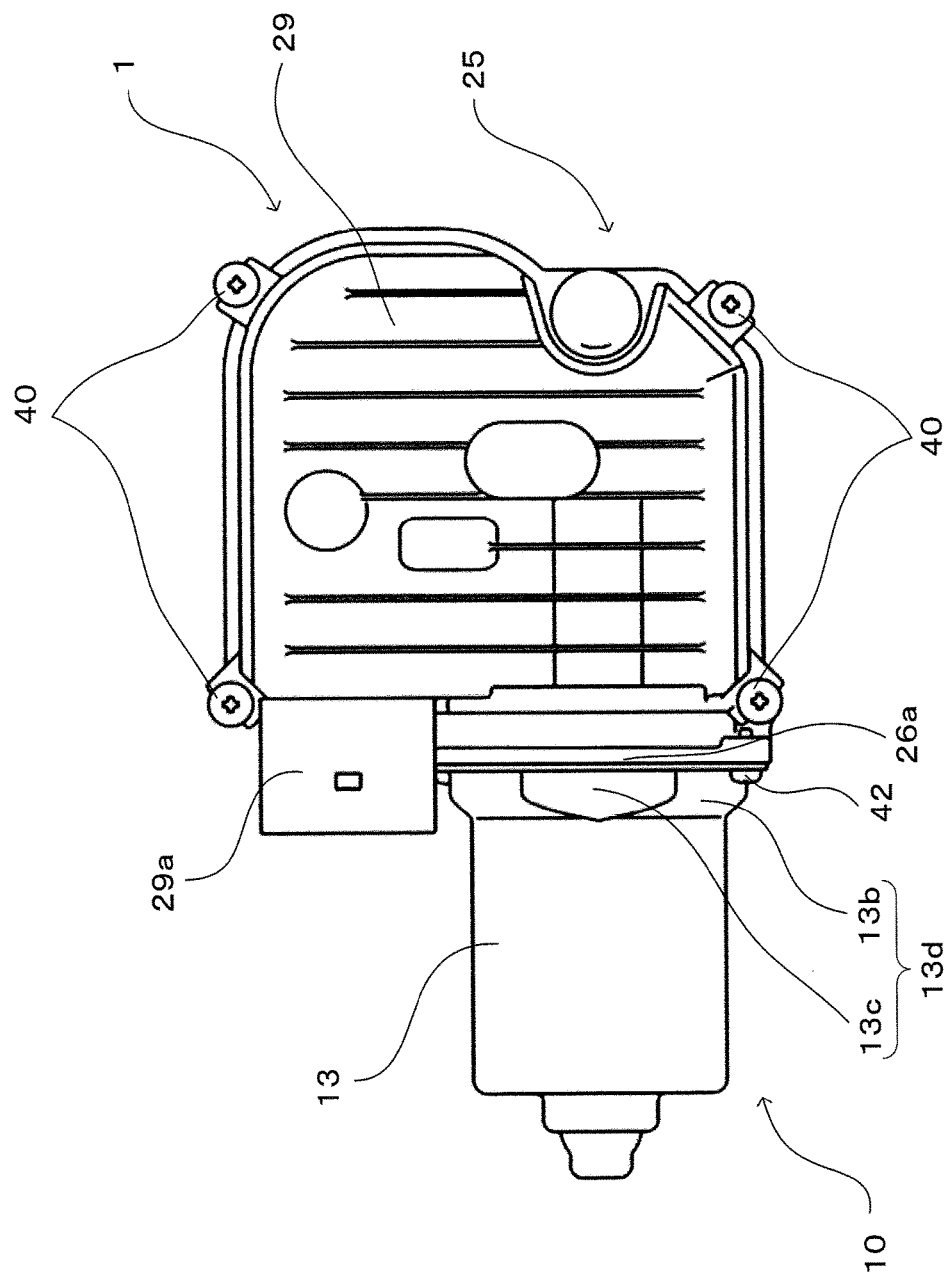
FIG. 1 is a view of a motor with speed reduction mechanism according to one embodiment of the present invention seen from a gear housing cover side.
Figure 2A:
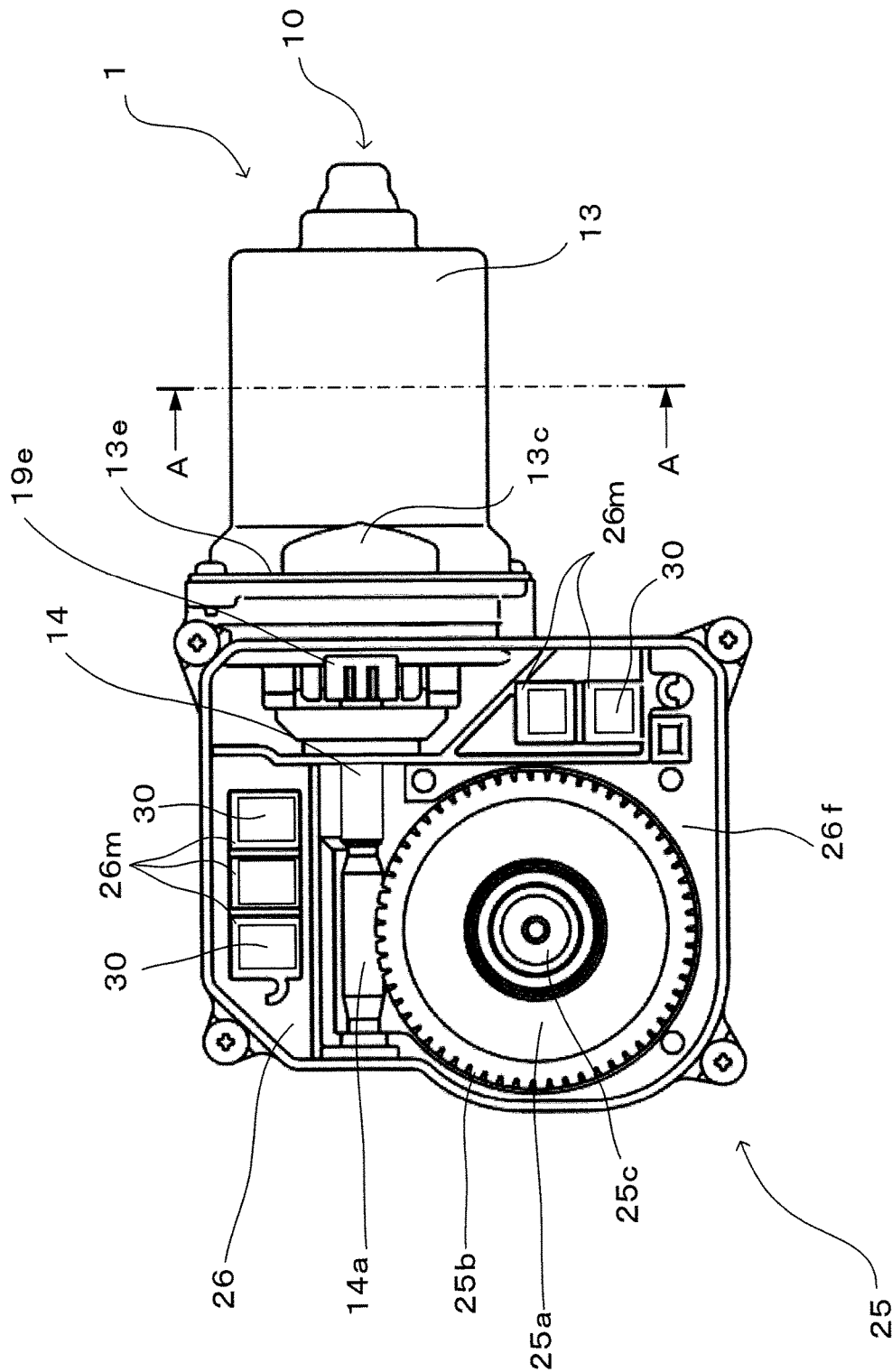
FIG. 2A is a view of a state in which a gear housing cover is removed from it shown in FIG. 1.

A wiper motor 1 as a motor with speed reduction mechanism according to the present invention includes: as shown in FIGS. 1 and 2A, a motor unit 10 for performing a rotating operation with electric current; and a speed reduction mechanism unit 25 for reducing the speed of rotation of the motor unit 10 and transmitting the speed reduced rotation to an output shaft 24.

Figure 2B:
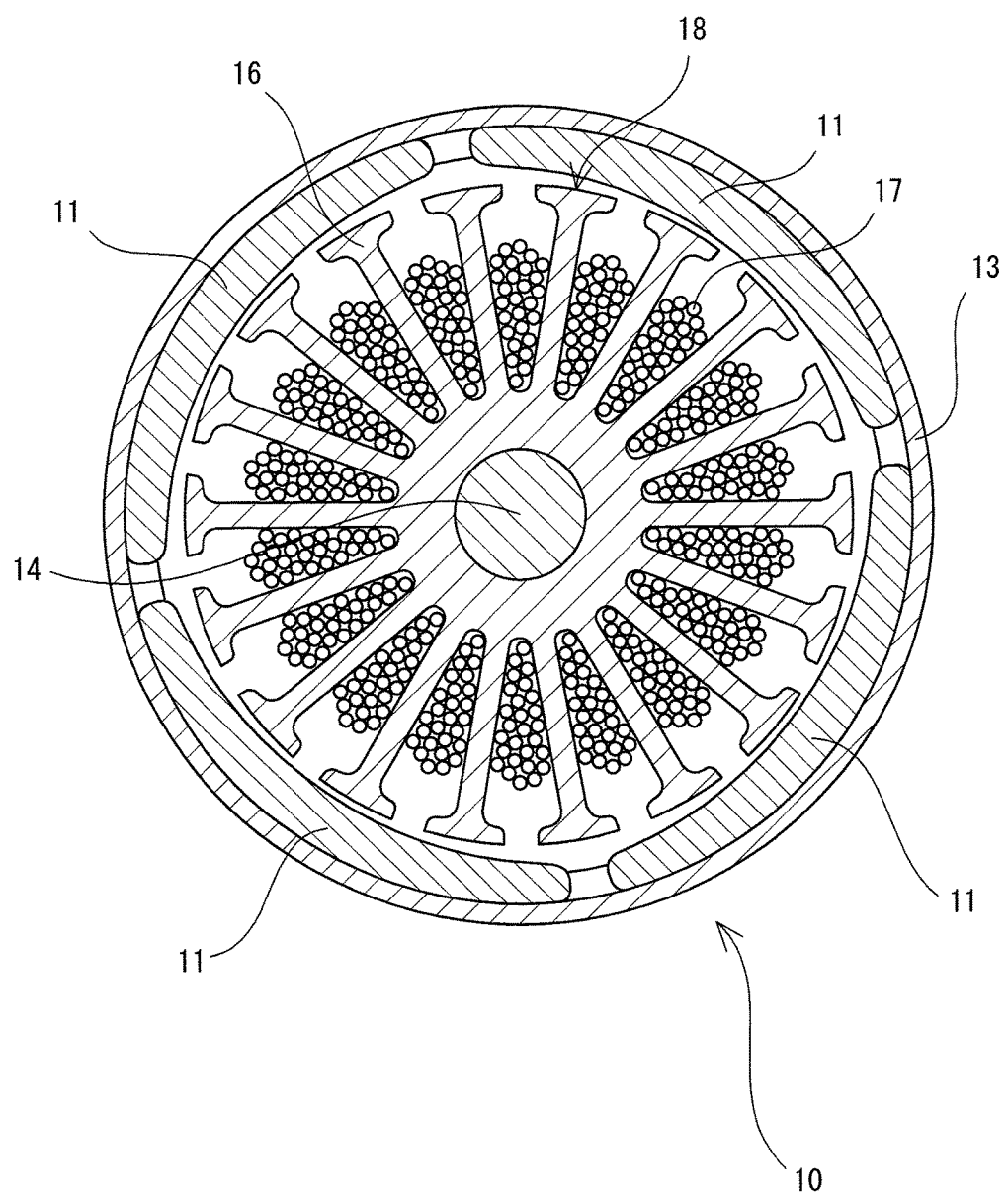
FIG. 2B is a view of a state in which an armature is removed from a yoke in a sectional view of the yoke along a line A-A in FIG. 2A.

As shown in FIGS. 1, 2A and 2B, the motor unit 10 includes a yoke (first case) 13 which is formed into a bottomed cylindrical shape, at least four magnets 11 are fixed to an inner circumferential surface thereof, a gear housing 26 is fixed to one end surface thereof, and a shaft bearing part 12 is fixed to the other end surface thereof.

Figure 3A:
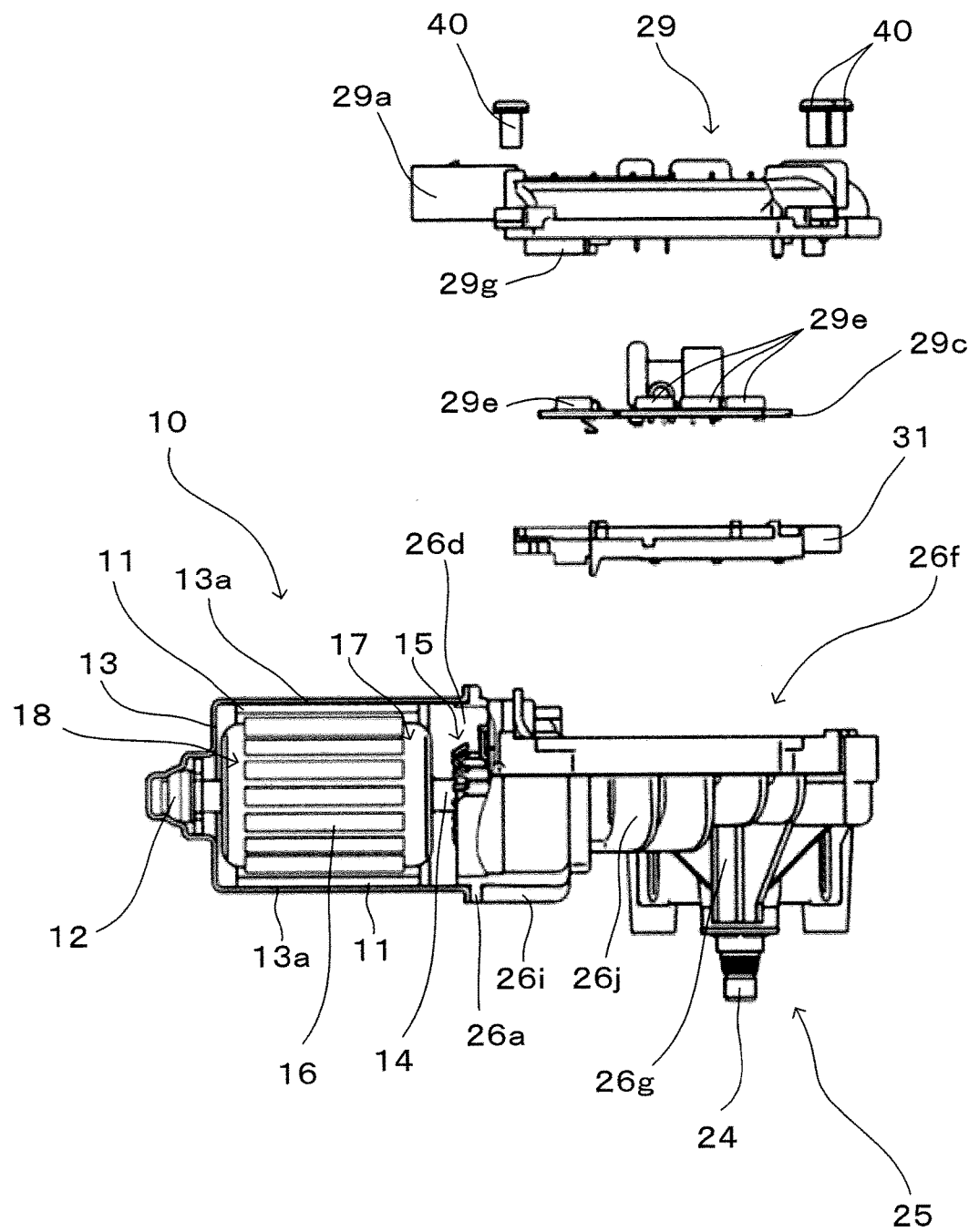
FIG. 3A is a fragmentary sectional and development view of the wiper motor with speed reduction mechanism shown in FIG. 1.
Figure 5A:
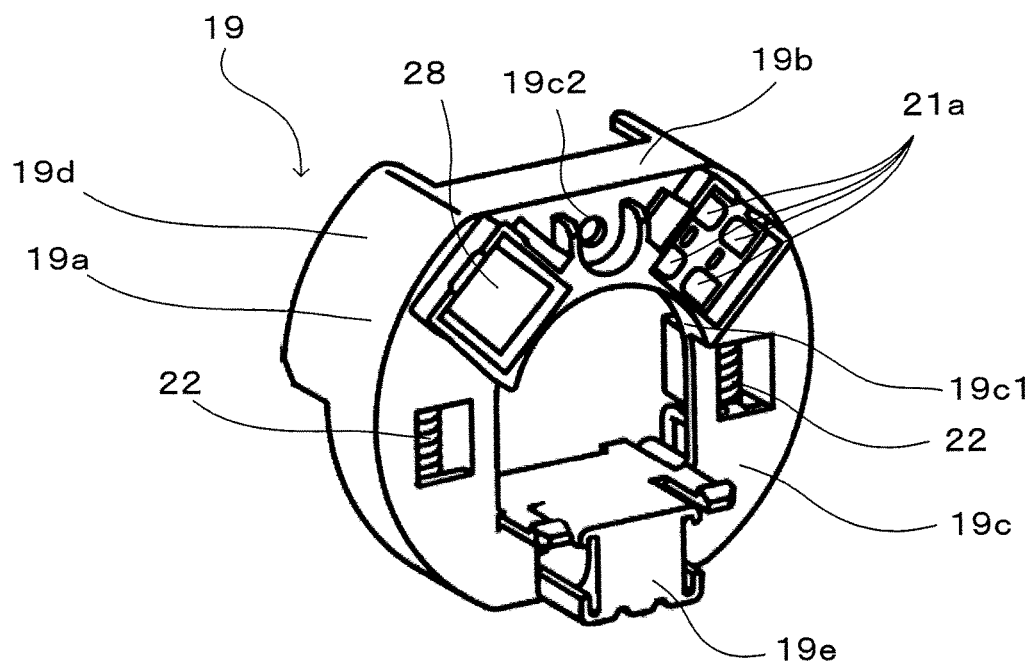
FIG. 5A is a perspective view of a brush holder part seen from a brush terminal connecting part side.
Figure 5B:
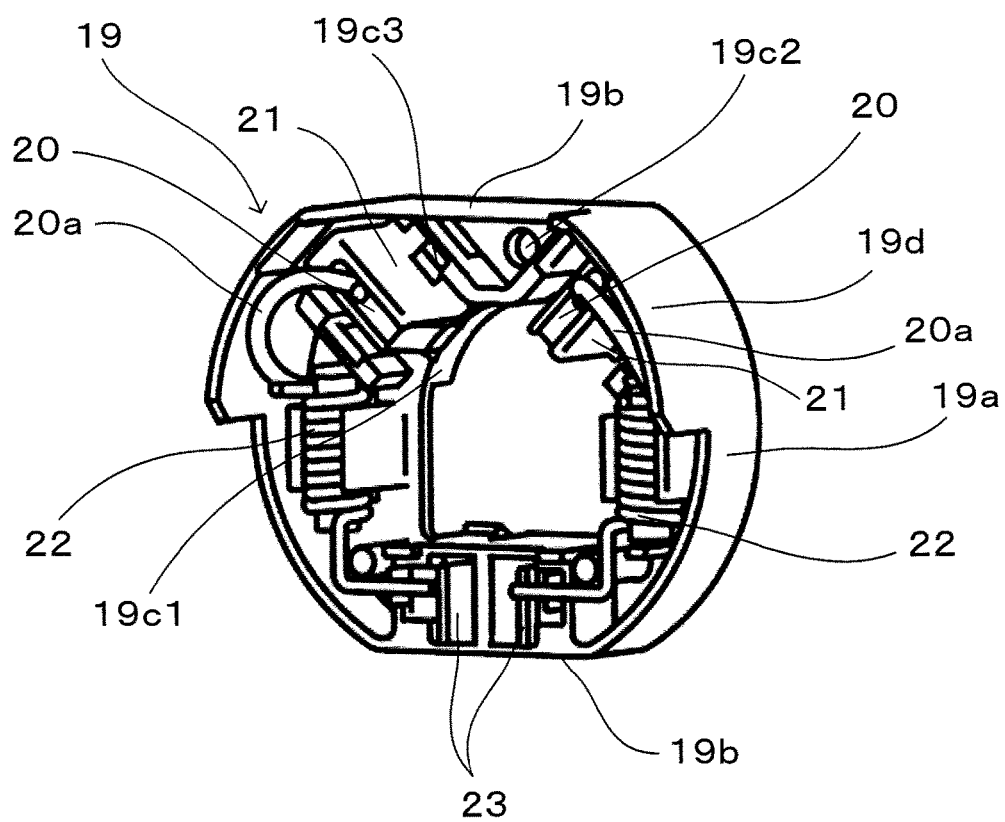
FIG. 5B is a perspective view of the brush holder part seen from a brush holder side.

Furthermore, as shown in FIGS. 2A and 3A, the motor unit 10 includes an armature shaft 14 having one end rotatably supported by the bearing part 12 and having a worm part 14a formed at its tip, a commutator 15 fixed to the armature shaft 14, an armature core 16 adjacent to the commutator 15 and fixed to the armature shaft 14, and a winging wire part 17 wound around the armature core 16, wherein an armature 18 is rotatably disposed on the inner side of the plurality of magnets 11. Furthermore, as shown in FIGS. 5A and 5B, the motor unit 10 has a brush holder unit 19 including a plurality of brushes 20 and 20 slidably supporting the commutator 15 with the rotation of the armature 18, and brush holders 21 and 21 holding the respective brushes 20 and 20.

The speed reduction mechanism unit 25 includes a worm wheel part 25a for reducing the speed of rotation of the motor unit 10, and the gear housing (second case) 26 having a bottomed speed reduction mechanism accommodating part 26f in which the worm wheel part 25a is accommodated. Furthermore, the speed reduction mechanism unit 25 further includes a gear housing cover 29 covering an opening of the speed reduction mechanism accommodating part 26f, and a brush holder accommodating part 26d in which the brush holder unit 19 is accommodated. The worm wheel part 25a includes the output shaft 24 for reducing the speed of rotation of the armature 18 of the motor unit 10 and transmitting the speed reduced rotation, and the brush holder accommodating part 26d is cylindrically formed and is integrally molded with the gear housing 26. The gear housing 26 and the gear housing cover (third case) 29 are fixed to each other by a plurality of screws 40. The wiper motor having an integrated case is constructed by mechanically connecting the yoke (first case) 13, the gear housing (second case) 26, and the gear housing cover (third case) 29 to each other.

The worm wheel part 25a included in the speed reduction mechanism unit 25 is made of resin such as polyacetal, into a disk shape, and has an outer peripheral surface formed with an engaging part 25b engaged with the worm part 14a of the armature shaft 14. The output shaft 24 is integrally mounted at the center of rotation of the worm wheel part 25a. With this, when the armature 18 rotates, with the rotation of the worm part 14a, the worm wheel part 25a engaged with the worm part 14a rotates with the reduced speed of rotation, thereby reducing the speed of rotation of the armature 18 and transmitting the reduced speed of rotation to the output shaft 24.

A button-shaped magnet 25c is attached to a base end of the output shaft 24 of the worm wheel part 25a, so that its rotation center is axially aligned with the rotation center of the output shaft 24. Furthermore, the magnet 25c is polarized so as to have: an N pole in a range of 90-180 degrees in one circumferential direction defined around its rotation center as a center; and an S pole in a range of 180-270 degrees in the other circumferential direction. In the vicinity of the annular magnet 25c, a Hall IC for absolute position detection 29d is provided on a control board 29c which will be further described below.

Figure 9:
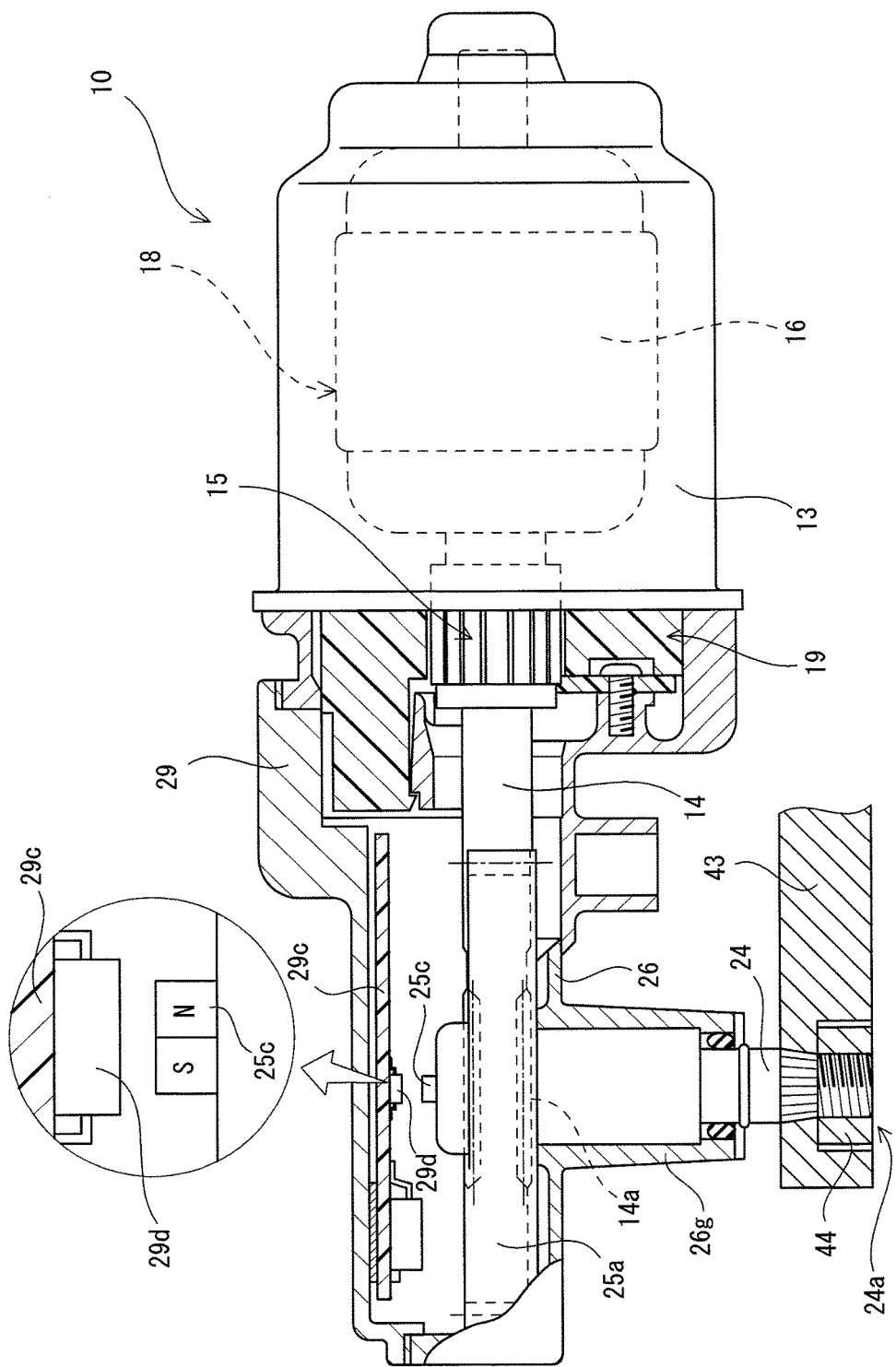
FIG. 9 is a sectional view of a speed reduction mechanism unit of the motor with speed reduction mechanism shown in FIG. 1.

As shown in FIG. 9, the Hall IC for absolute position detection 29d is configured to detect the change of magnetic field generated by the magnet 25c with the rotation of the output shaft 24, and to convert it into angle data. And on the basis of a signal generated by the Hall IC for absolute position detection 29d so as to correspond to the change of magnetic field generated by the magnet 25c, an angle of a current position of a wiper arm on a windshield (not shown) from its specific position such as lower reversing position or stop position of the wiper device attached to the top of the output shaft 24 of the motor with speed reduction mechanism is calculated. The magnet 25c is integrally fixed to the base end of the output shaft, a swinging member 43 such as wiper arm or motor crank is directly fixed to one end of the output shaft by a fixing member 44 such as nut so as not to move around it, and an intermediate portion of the output shaft 24 is supported by an output shaft support part 26g formed as part of the gear housing 26 (second case) so as to extend in an axial direction.

Since the output shaft 24 is prevented from being moved in the axial direction by this part, the movement of the wiper arm or the motor crank can be detected with accuracy by the Hall IC for absolute position detection 29d. Also, since the wiper motor 1 is made up of a four-pole wiper motor, the wiper motor 1 can be reduced in size, and inertia of the wiper motor 1 can be reduced. Therefore, since the loss of the wiper motor 1, such as balance in rotation of the armature 18, is reduced, and responsiveness of control and accuracy of wiping control can be enhanced. Furthermore, since it is not necessary to provide, to the wiper motor 1, a magnet for detecting the rotation of the armature shaft 14 and a sensor for detecting the pole of the magnet, the armature shaft 14 can be reduced in length, and the wiper motor 1 can be reduced in size.

Then, a heat dissipating structure of the gear housing 26 will be described as features of the present invention on the basis of FIGS. 2A, 3A, 6 and 7.

The yoke 13 is integrally molded by press working from a plate material into a bottomed cylindrical shape, and a magnet fixing part 13a in which the plurality of magnets 11 are fixed onto its inner peripheral surface and a yoke connecting part 13d integrally connected to the magnet fixing part 13a are formed in the yoke 13. And in the yoke connecting part 13d, paired curved parts 13b and paired flat surface parts 13c alternately connected so as to be formed into an elliptical shape seen from an axial direction. On the end face of the yoke 13, a flange shaped fixing part 13e is formed, and the gear housing 26, which will be described further below, is fixed to the flange shaped fixing part 13e. The yoke connecting part 13d is formed so that an arc diameter is gradually widened from the magnet fixing part 13a toward the yoke end face. On the inner peripheral surface of the magnet fixing part 13a, four magnets 11 are fixed with an adhesive or the like so that two N poles and two S poles, which are different magnetic poles, are alternately disposed, that is, the same poles face each other.

The armature shaft 14 has one end rotatably supported by the bearing part 12 of the yoke 13, and the armature shaft 14 is disposed on the inner side of the four magnets 11. The armature shaft 14 has the other end formed with the worm part 14a formed into a spiral shape by component rolling.

As shown in FIG. 3A and FIG. 4A, the commutator 15 includes an insulating cylindrical part 15a formed into a cylindrical shape and made of insulating material such as thermosetting resin, and a plurality of segment parts 15b spaced at predetermined intervals in a circumferential direction on an outer peripheral surface of the insulating cylindrical part 15a and made of electrical conducting material such as copper. The commutator 15 is fixed to the armature shaft 14 so that the inner peripheral surface of the insulating cylindrical part 15a is engaged with the outer peripheral surface of the armature shaft 14. At one end on the outer peripheral surface of each segment part 15b, a coil connecting part 15c is formed, and each coil connecting part 15c is connected to a coil 17a.

The armature core 16 is formed into a cylindrical shape by stacking in layers predetermined numbers of core substrates which are stamped out by press working, and the armature core 16 includes a shaft fixing part to which the armature shaft 14 is fixed, and eighteen teeth parts radially extending from the shaft fixing part.

Figure 3B:
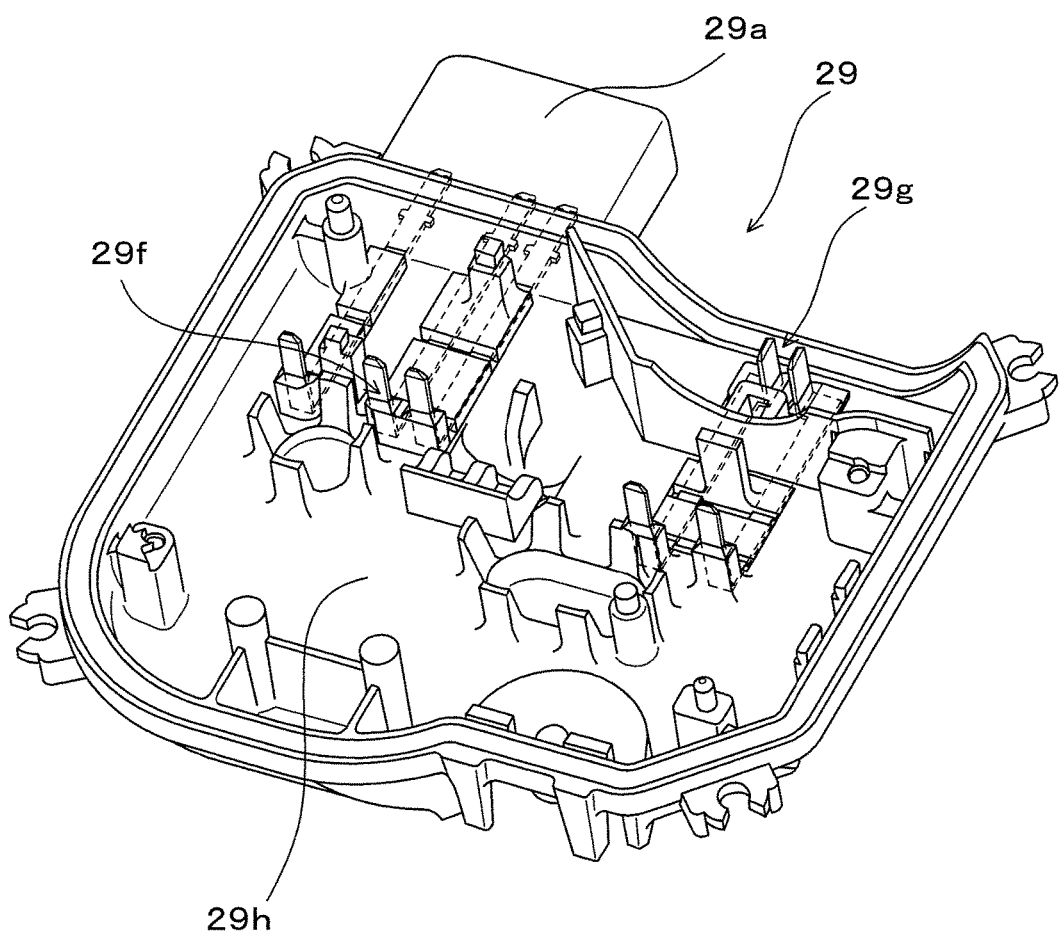
FIG. 3B is a perspective view of a gear housing cover.
Figure 3C:
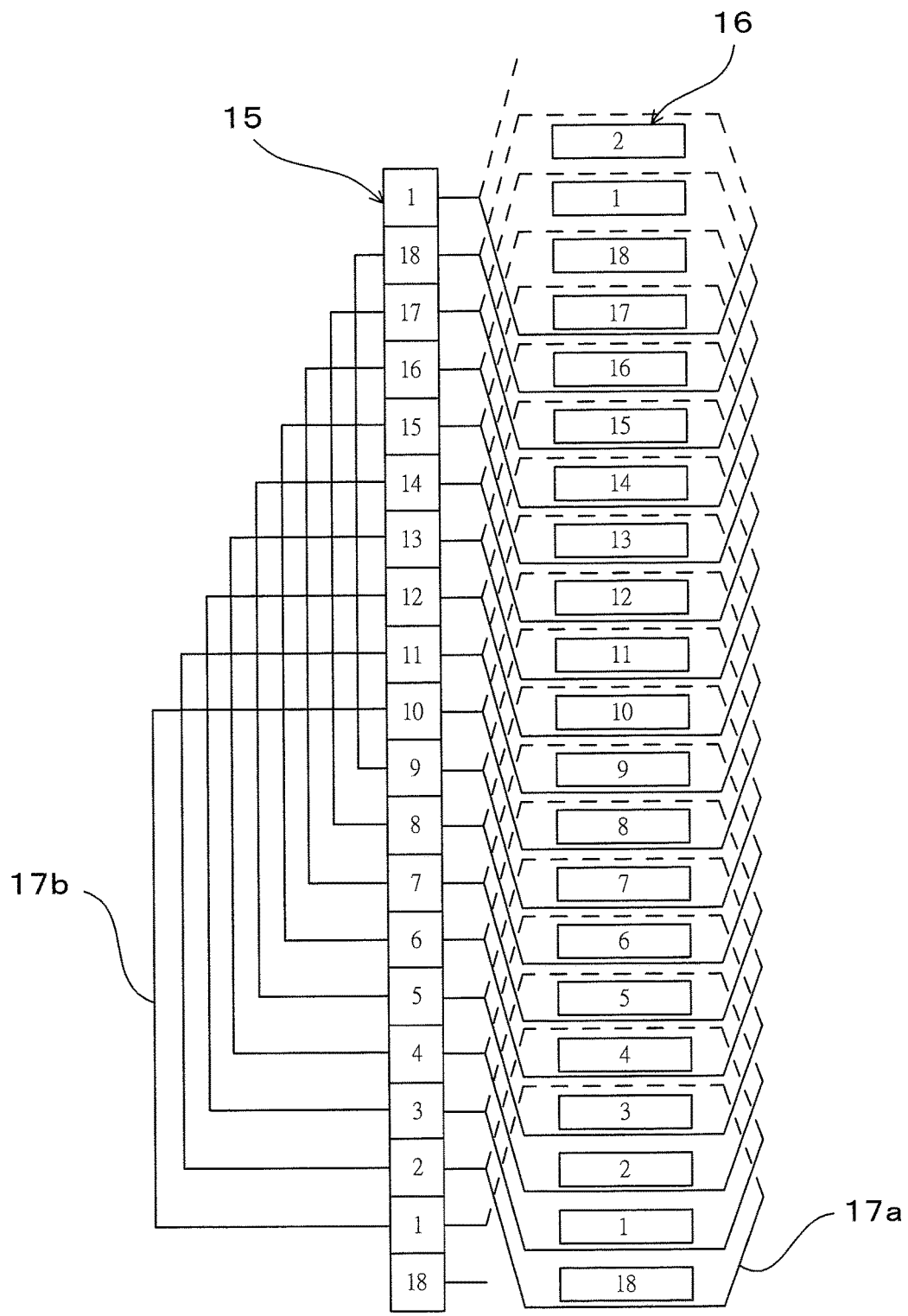
FIG. 3C is a development view of windings of an armature.

As shown in FIGS. 3A and 3C, a coil 17a made of copper wire is wound around the armature core 16. One end of the coil 17a is fixed to the coil connecting part 15c of one of the segment parts 15b, and the coil 17a is wound by lap winding between predetermined teeth parts a plurality of times. Furthermore, after the coil 17a is wound by lap winding between the predetermined teeth parts the plurality of times, the other end of the coil 17a is fixed to the coil connecting part 15c of another segment part 15b. Then, a connecting line (electric current supply line) 17b is connected to one segment part 15b facing another segment part 15b. In this manner, the coil 17a is wound around the armature core 16 by repeating a process of winding the coil 17a about each teeth part. With this, when electric power is supplied to the brushes 20 and 20, electric current flows through the coil 17a, and the armature 18 is rotated, thereby driving the wiper motor 1.

When the four pole magnet is used, four brushes are normally required. However, in this invention, by connecting facing segments to each other through the connecting line (electric current supply line) 17b, the electric current flowing through a segment part from one brush 20 flows also through a facing segment part via the connecting line 17b. With this, the number of brushes can be decreased from four to two.

As shown in FIGS. 5A and 5B, the brush holder unit 19 includes a base part 19c in which paired curved parts 19a and paired flat surface parts 19b are alternately connected so as to be formed into an elliptical shape.

The base part 19c is formed with an opening portion 19c1 through which the armature shaft 14 is penetrated, and a fixing opening portion 19c2 through which a screw 41 is penetrated, thereby fixing the brush holder unit 19 and the gear housing 26. And the brush holders 21 and 21 made of metal material such as brass are fixed to the base part 19c, and two brushes 20 and 20 are disposed in the brush holders 21 and 21 so as to be able to get close to and away from the commutator 15. As shown in FIGS. 4A and 5B, in this invention, two brushes 20 and 20 are located around the rotation center O of the armature 18 at intervals of approximately 90 degrees.

The brush holders 21 are disposed in the vicinity of one of the paired flat surface parts 19b of the base part 19c. Fixing claws 21a of the brush holders 21 are inserted in a brush holder fixing part 19c3 formed in the base part 19c, and the fixing claws 21a are folded on the back surface side of the base part 19c, so that the brush holder 21 is fixed to the base part 19c.

Furthermore, the brush holder unit 19 includes a brush holder guide wall 19d and a brush terminal connecting part 19e, and the brush holder guide wall 19d is formed into a shape approximately the same as the outer shape (elliptical shape) of the base part 19c and disposed so as to extend at the right angle from the base part 19c. And the brush terminal connecting part 19e protrudes from the base part 19c in a direction opposite to the brush holder guide wall 19d and at the right angle with respect to the base part 19c. Furthermore, the brush terminal connecting part 19e is disposed at a position facing the brushes 20, that is, on the other flat surface part 19b away from the one flat surface part 19b where the brushes 20 and 20 are disposed. With this, it is hard to transmit heat generated from the brushes 20 to the brush terminal connecting part 19e and the control board 29c electrically connected to the brush terminal connecting part 19e.

On the base part 19c, choke coils 22, 22 as noise preventive elements are mounted, and one end of each of the choke coils 22, 22, and a corresponding one of the brushes 20 and 20 are electrically connected via a corresponding one of pigtails 20a, 20a. To the other end of each choke coil 22, a female type brush terminal 23 is electrically connected, and the female type brush terminal 23 is electrically connected to a male type terminal 29g provided to the gear housing cover 29. The female type brush terminal 23 has a tip thereof accommodated in the brush terminal connecting part 19e, and is exposed from the brush terminal connecting part 19e so as to be able to electrically connect to the male type terminal 29g of the gear housing cover 29. When the brush holder unit 19 is mounted on the brush holder accommodating part 26d, the brush holder guide wall 19d abuts on an inner wall 26d1 of the brush holder accommodating part 26d, and the brush holder unit 19 is guided to a bottom portion 26d2 of the brush holder accommodating part 26d. Then, the brush holder unit 19 and the gear housing 26 are fixed with the screw 41 penetrating through the fixing opening portion 19c2 formed in the base part 19c.

Figure 4B:
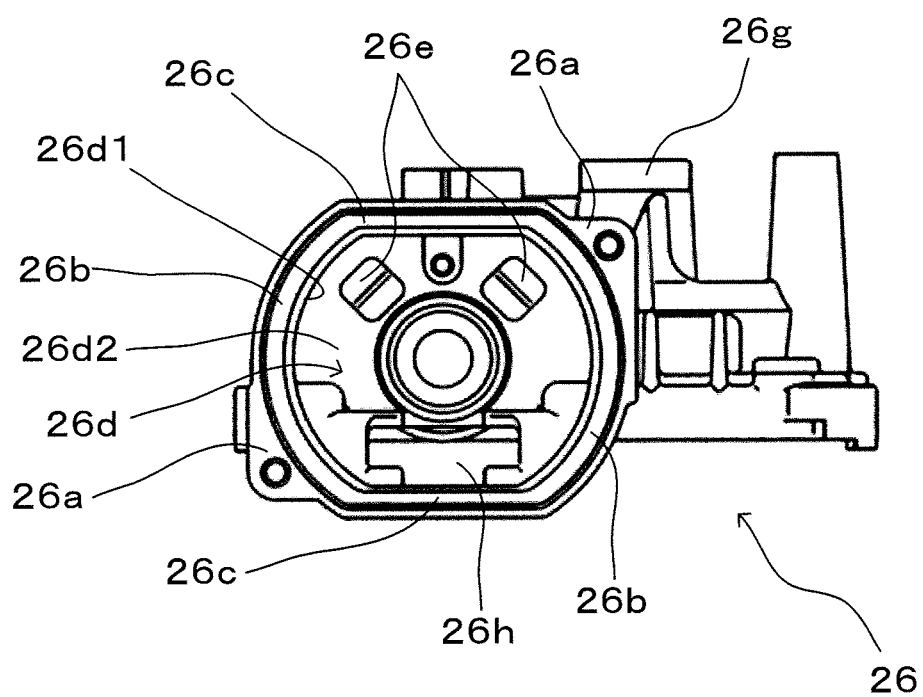
FIG. 4B is a view of a state in which the brush holder part is removed from the wiper motor with speed reduction mechanism, shown in FIG. 4A.

As shown in FIGS. 2A, 3A, and 4B, the gear housing 26 is formed by die cast molding by using metal material such as aluminum. And the gear housing 26 is formed with a yoke fixing part 26a, and the yoke fixing part 26a and the flange shaped fixing part 13e of the yoke 13 abut on each other, and the yoke 13 is mounted on the gear housing 26 with a plurality of screws 42.

The yoke fixing part 26a is formed into an elliptical shape with paired curved parts 26b and paired flat surface parts 26c being alternately connected so as to match the shape of the flange shaped fixing part 13e. In the gear housing 26, the brush holder accommodating part 26d is integrally formed with the yoke fixing part 26a, and the brush holder unit 19 is accommodated in the brush holder accommodating part 26d. On the bottom portion 26d2 of the brush holder accommodating part 26d, brush holder abutting parts 26e each abutting on the fixing claw 21a of the brush holder 21 are formed so as to protrude from the bottom portion 26d2. Heat generated from the brushes 20 and 20 is transmitted from the fixing claws 21a of the brush holders 21 via the brush holder abutting parts 26e to the gear housing 26, and is dissipated from the gear housing 26 to the outside.

Furthermore, in the gear housing 26, the speed reduction mechanism accommodating part 26f in which the worm wheel part 25a is accommodated is formed so as to be adjacent to the brush holder accommodating part 26d. In the gear housing 26, the output shaft supporting part 26g for directly or indirectly supporting the output shaft 24 is formed in a direction opposite to an opening of the speed reduction mechanism accommodating part 26f.

Furthermore, in the speed reduction mechanism accommodating part 26f, a cover connecting part 26h opens. After the brush holder unit 19 described above is accommodated in the brush holder accommodating part 26d, two male type terminals 29g which are provided so as to protrude from the bottom surface of the gear housing cover 29 toward the speed reduction mechanism accommodating part 26f penetrate through the cover connecting part 26h to be electrically connected to the female type brush terminals 23 of the brush holder unit 19 disposed in the speed reduction mechanism accommodating part 26f.

The output shaft 24 protruding from the output shaft supporting part 26g is fixed by an output shaft fixing part (a teeth washer) 27, and to the tip of the output shaft 24, a wiper device fixing part 24a to which a swinging member 43 such as wiper arm or motor crank is directly or indirectly fixed by a fixing member 44 such as nut is formed, thereby mechanically connecting components forming the wiper device (not shown).

Figure 6:
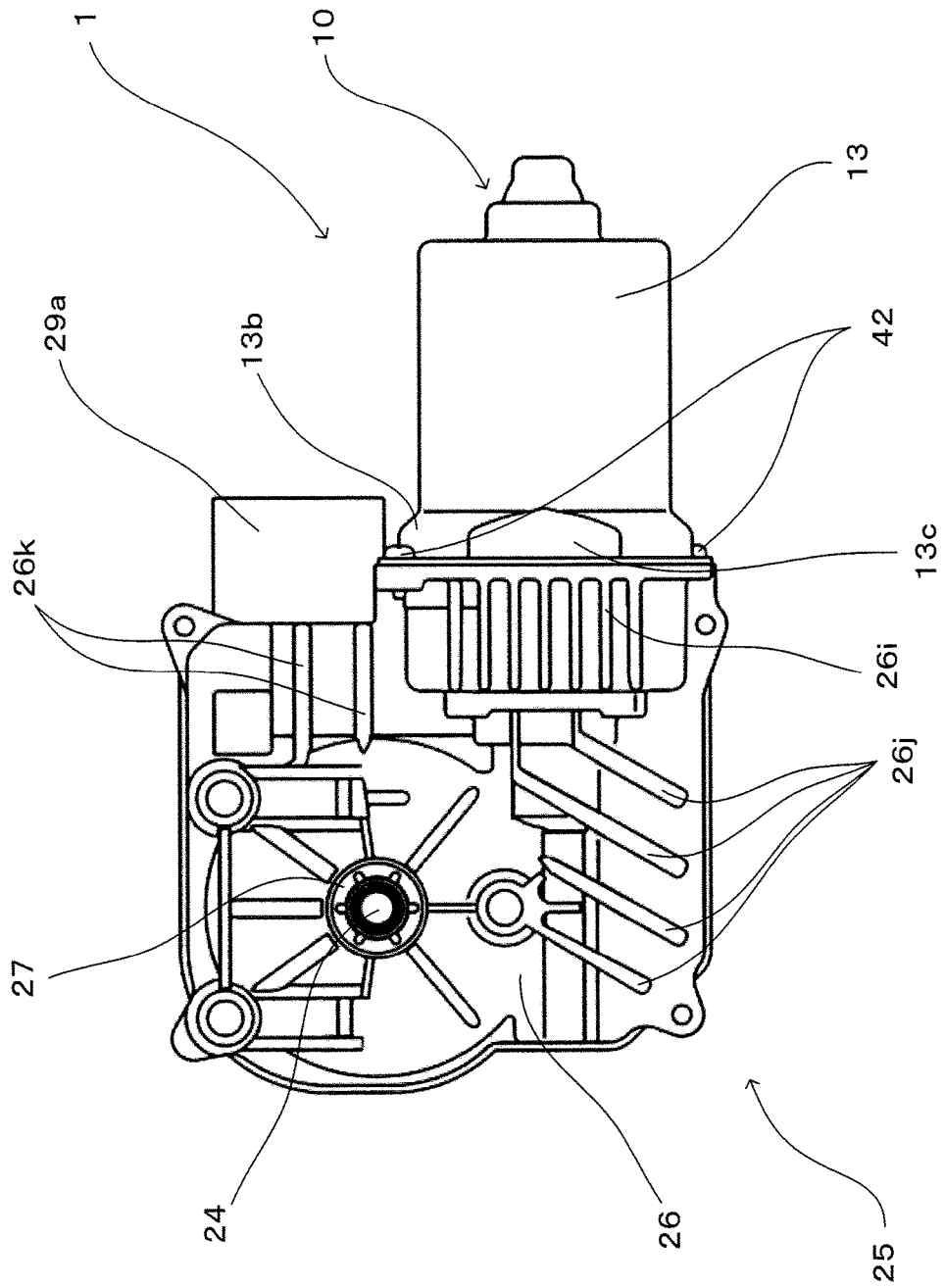
FIG. 6 is a view of the wiper motor with speed reduction mechanism according to the embodiment of the present invention seen from an output shaft side.
Figure 7:
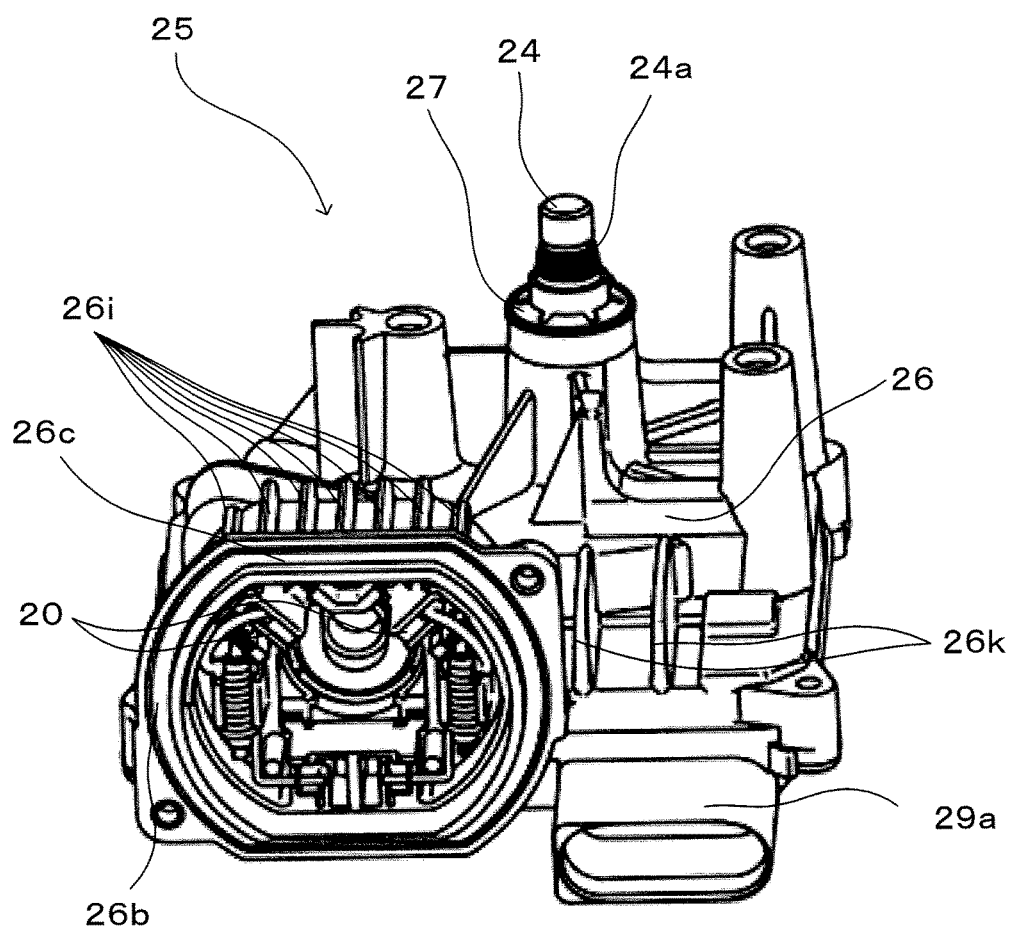
FIG. 7 is a perspective view of a state in which a motor unit is removed from the motor with speed reduction mechanism according to the embodiment of the present invention.

As shown in FIGS. 6 and 7, first heat sinks 26i as first heat dissipating members for dissipating Joule heat generated by electrical factor, that is, contact resistance between the brushes 20 and 20 and the commutator 15, and frictional heat generated by mechanical factor, that is, sliding movement between the brushes 20 and 20 and the commutator 15, a second heat sink 26j as a second heat dissipating member for dissipating heat generated from FETs 29e mounted on the control board, which will be further described below, and a third heat sink 26k as a third heat dissipating member are formed on an outer peripheral surface of the gear housing 26 positioned at a back surface of the speed reduction mechanism accommodating part 26f.

The brushes 20 and 20 are disposed in the vicinity of an outer peripheral surface of one of the paired flat surface parts 26c of the brush holder accommodating part 26d, and the first heat sinks 26i protrude from this surface, and are spaced from each other at predetermined intervals in parallel. The first heat sinks 26i are formed so as to be parallel to a longitudinal direction of the armature shaft 14.

As shown in FIG. 7, in this invention, since two brushes 20 and 20 which are disposed so as to be spaced apart from each other at intervals of approximately 90 degrees are disposed in the vicinity of the first heat sinks 26i, heat generated from the brushes 20 and 20 is transmitted to the first heat sinks 26i and dissipated to the outside. And, since the brushes 20 and 20 are disposed at a position away from the control board 29c with respect to the first heat sinks 26i, it is easy to transmit heat generated from the brushes to the first heat sinks 26i, and it is hard to transmit it to the control board 29c.

Furthermore, as shown in FIG. 5A, between the base part 19c and the brush holder abutting part 26e of the gear housing 26, a gel type heat conducting member 28 is disposed. Heat generated from the brushes 20 and 20 is easily transmitted via the heat conducting member 28 to the first heat sinks 26i.

To an opening of the gear housing 26, the gear housing cover 29 formed into a bottomed shape and formed of insulating material is provided. An open end face of the gear housing 26 and the gear housing cover 29 abut on each other, and the gear housing cover 29 is fixed to the gear housing 26 with the plurality of screws 40.

As shown in FIGS. 3A, 3B, and 4A, the gear housing cover 29 includes a coupler part 29a, and the coupler part 29a is provided with a plurality of terminals 29f. One end of each of the plurality of terminals 29f is electrically connected to a connector part (not shown) provided to a vehicle, and the other end of each of the plurality of terminals 29f is electrically connected to the control board 29c. And the terminals 29f have intermediate portions thereof which are buried in the gear housing cover 29.

Furthermore, from a bottom portion 29h of the gear housing cover 29, two male type terminals 29g protrude, and are electrically connected to the female type brush terminals 23 disposed in the brush holder unit 19. With this configuration, electric power supplied from a power supply of the vehicle is supplied to the motor unit 10 through the plurality of terminals 29f, the control board 29c, the male type terminals 29g, the female type brush terminals 23, the pigtails 20a, and the brushes 20 and 20.

Figure 8:
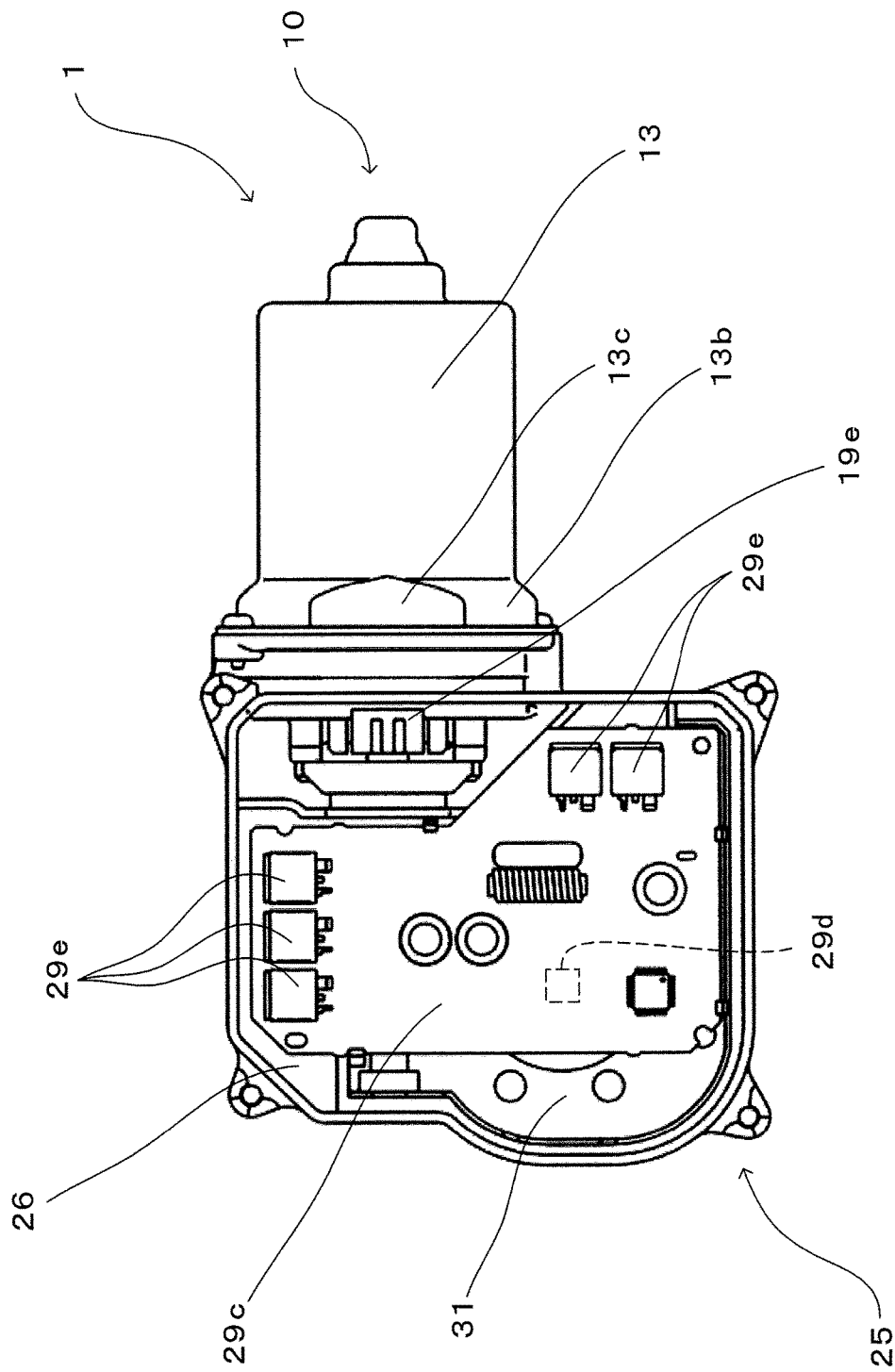
FIG. 8 is a view of a state in which a control board is mounted on it shown in FIG. 2A.

As shown in FIG. 8, the control board 29c is mounted on the bottom portion 29h of the gear housing cover 29 with a plurality of screws, and is accommodated in the speed reduction mechanism accommodating part 26f of the gear housing 26.

On a surface of the control board 29c facing the bottom portion 29h of the gear housing cover, the Hall IC for absolute position detection 29d is provided. The Hall IC for absolute position detection 29d is disposed so as to face the magnet 25c provided to the base end of the output shaft of the worm wheel part 25a, and configured to detect the rotating state of the output shaft 24 of the wiper motor 1.

And, based on the rotating state of the output shaft 24 of the wiper motor 1, the control board 29c is configured to control the rotation of the armature 18 of the motor unit 10.

The control board 29c is provided with the plurality of FETs 29e to control electric current flowing through the motor unit 10 with an ON/OFF operation of the FETs 29e, and to control the rotation of the armature 18 of the motor unit 10 in a forward direction and a reverse direction. Furthermore, on the control board 29c, a temperature detecting part not shown in the drawing is disposed, thereby detecting the temperature of the control board 29c.

When load is applied to the wiper motor 1 and the temperature of the control board 29c detected by the temperature detecting part becomes equal to or higher than a predetermined temperature, based on a signal from the temperature detecting part indicating that the temperature becomes equal to or higher than the predetermined temperature, the control board 29c causes the rotation numbers to be decreased, and even further, causes the rotation of the armature 18 to stop, thereby achieving protection of the control board 29c of the wiper motor 1 by the temperature detecting part.

Also, on a surface near the FETs 29e of the speed reduction mechanism accommodating part 26f, a FET heat dissipating part 26m is formed. The FET heat dissipating part 26m protrudes from the bottom surface of the speed reduction mechanism accommodating part 26f toward an opening direction, and is formed near a back surface of the control board 29c to which the FETs 29e are fixed. On the FET heat dissipating part 26m, a FET heat dissipating member 30 of a gel type and formed of a material with a high heat conductivity is mounted so as to fill a gap between the control board 29c and the FET heat dissipating part 26m. Heat generated from the FETs 29e is transmitted via the control board 29c and the FET heat dissipating member 30 to the FET heat dissipating part 26m, and is dissipated from the second heat sink 26j and the third heat sink 26k, formed on the outer peripheral surface of the gear housing 26 to the outside of the gear housing. With this, an increase in temperature of the control board 29c due to heating of the FETs 29e can be suppressed. For this reason, the wiper motor 1 can be actuated for a longer time.

Furthermore, between the worm wheel part 25a accommodated in the speed reduction mechanism accommodating part 26f and the control board 29c, a control board cover 31 made of insulating material is mounted on the gear housing cover 29. The control board cover 31 is disposed between the worm wheel part 25a and the control board 29c, and is fixed so that grease applied to the speed reduction mechanism unit 25 is not adhered to the control board 29c.

When the wiper device is actuated for a long period of time, the brushes 20 and 20, the motor unit 10, and the FETs 29e generate heat, thereby possibly preventing continuous actuation of the wiper device. For this reason, in the present invention, the second heat sink 26j and the third heat sink 26k are further formed near the first heat sinks 26i on the outer peripheral surface of the gear housing 26 so as to extend outward (on a side opposite to the gear housing cover 29). The plurality of FETs 29e are disposed near the second heat sink 26j and the third heat sink 26k across the control board 29c. With this, heat generated from the FETs 29e is dissipated via the control board 29c from the second heat sink 26j and the third heat sink 26k to the outside of the gear housing 26.

As described above, in the above embodiment, a case where the present invention is applied to a wiper motor having connecting lines has been described. However, the present invention is not meant to be restricted to this embodiment, and can be applied to a wiper motor with speed reduction mechanism in general, the motor having a brush accommodated in a gear housing formed into an elliptical shape, and a structure in which a heat sink is disposed on an outer peripheral surface of the gear housing in the vicinity of the brush.

Furthermore, although the four-pole wiper motor provided with a four-pole magnet is described as one embodiment of the present invention, the wiper motor may be provided with a magnet larger in number of poles than the four-pole magnet, or a cylindrical magnet (ring magnet) polarized so as to have four or more poles.

The wiper motor is used as a driving source of a wiper device mounted on a vehicle such as an automobile, and used to wipe out rainwater and others attached onto a windshield by swing the wiper arm.

While the present invention has been illustrated and described with respect to a particular embodiment thereof, it should be appreciated by those of ordinary skill in the art that various modifications to this invention may be made without departing from the spirit and scope of the present.

What is claimed is:

1. A wiper motor with a speed reduction mechanism, comprising:
   a reversible electric motor;
   a speed reduction mechanism driven by the electric motor and having an output shaft; and
   a control circuit board for controlling the electric motor,
   wherein the electric motor has:
      a cylindrical yoke;
      a four pole-magnet disposed on an inner surface of the yoke, different magnetic poles thereof being alternately arranged on the surface;
      an armature housed in the yoke and including: an armature shaft rotatably supported by the yoke and having a worm portion formed thereon; a commutator mounted on the armature shaft and having a plurality of segments; a core mounted on the armature shaft and formed with a plurality of teeth in the same number as that of the segments of the commutator; a plurality of windings wound around the corresponding teeth of the core; and a plurality of connecting lines electrically connecting a pair of the segments radially opposed each other; and
      a brush holder unit having: a first brush and a second brush capable of making sliding contact with the segments of the commutator, the first and the second brushes being disposed so as to be spaced apart from each other at intervals of 90 degrees; and a pair of brush terminals respectively electrically connected to the first and the second brushes,
   wherein the speed reduction mechanism has:
      a reduction gear having: a worm wheel engaged with the worm portion of the armature shaft of the electric motor; an output shaft integrally mounted at the rotation center of the worm wheel;
      a gear housing connected to the yoke of the electric motor and having a brush holder accommodation portion in which the brush holder unit of the motor is accommodated, the brush holder accommodation portion having a wall formed with: a through hole through which the brush terminals of the brush holder unit of the electric motor are inserted; and a reduction gear accommodation portion integral with the brush holder accommodation portion and accommodating the reduction gear, the worm portion of the armature shaft of the electric motor, and the control circuit board;
      a gear housing cover adapted to cover the reduction gear accommodation portion; and
      a position magnet attached to a base end of the output shaft of the reduction gear and having a pair of magnetized parts each having the shape of a semicircle, one of the magnetized parts being an N-pole, the other of the magnetized parts being a S-pole,
   wherein the control circuit board is fixed to the gear housing cover of the speed reduction mechanism and has:
      an absolute position detecting device disposed so as to face the position magnet of the speed reduction mechanism and the absolute position detecting device adapted to detect a rotational position of the position magnet of the speed reduction mechanism, and to generate a position signal indicative of the rotational position of the output shaft of the worm wheel; and
      a plurality of field effect transistors disposed on a first surface of the control circuit board facing the gear housing cover, and adapted to drive the armature of the electric motor on the basis of the position signal generated by the absolute position detecting device,
   wherein the gear housing is formed of metal by diecasting and has a heat dissipating member which includes a heat transfer material with high heat conductivity and is arranged between a second surface of the control circuit board opposite to the first surface of the control circuit board and an inner surface of the gear housing of the speed reduction mechanism and adapted to transmit heat generated from the field effect transistors to the gear housing, and
   wherein the gear housing further includes a heat sink provided on an outer surface of the reduction gear accommodation portion thereof the heat sink being overlapped with the heat transfer material and the field effect transistors.

2. The wiper motor according to claim 1, wherein on the same side as the opening of the reduction gear accommodating part, FET heat dissipating parts are disposed on the opposite side of the worm wheel part with respect to the worm part.

3. The wiper motor according to claim 1, wherein on the same side as the opening of the reduction gear accommodating part, the plurality of the field effect transistors is disposed along the armature shaft.

4. The wiper motor according to claim 1, wherein the gear housing has a heat dissipating platform formed so as to protrude from an inner surface thereof, and adapted to support FET heat dissipating parts.

5. The wiper motor according to claim 1, wherein
a first heat dissipating member is provided between the wall portion of the brush holder accommodating part and the first brush, and a second heat dissipating member is provided between the wall portion of the brush holder accommodating part and the second brush.

6. The wiper motor according to claim 1, wherein
the first brush and the second brush are disposed apart from the field effect transistors on the first surface of the control circuit board.

7. The wiper motor according to claim 1, wherein
the wiper motor is applied to a wiper apparatus for wiping a windshield of a vehicle.

8. A wiper motor with a speed reduction mechanism, comprising:
a reversible electric motor;
a speed reduction mechanism driven by the electric motor; and
a control circuit board for controlling the electric motor, wherein the electric motor has:
  a cylindrical yoke;
  a four pole-magnet disposed on an inner surface of the yoke, different magnetic poles thereof being alternately arranged on the surface;
  an armature housed in the yoke and including:
  an armature shaft rotatably supported by the yoke and having a worm portion formed thereon;
  a commutator mounted on the armature shaft and having a plurality of segments;
  a core mounted on the armature shaft and formed with a plurality of teeth in the same number as that of the segments of the commutator;
  a plurality of windings wound around the corresponding teeth of the core;
  a plurality of connecting lines electrically connecting a pair of the segments radially opposed each other; and
  a brush holder unit having: a first brush and a second brush capable of making sliding contact with the segments of the commutator, the first and the second brushes being disposed so as to be spaced apart from each other at intervals of 90 degrees;
and a pair of brush terminals respectively electrically connected to the first and the second brushes,
wherein the speed reduction mechanism has:
  a reduction gear having:
  a worm wheel engaged with the worm portion of the armature shaft of the electric motor;
  an output shaft integrally mounted at the rotation center of the worm wheel;
  a gear housing connected to the yoke of the electric motor and having: a brush holder accommodation portion in which the brush holder unit of the motor is accommodated, the brush holder accommodation portion having a wall formed with: a through hole through which the brush terminals of the brush holder unit of the electric motor are inserted;
  a reduction gear accommodation portion integral with the brush holder accommodation portion and accommodating the reduction gear, the worm portion of the armature shaft of the electric motor, and the control circuit board;
  a gear housing cover adapted to cover the reduction gear accommodation portion; and
  a position magnet attached to a base end of the output shaft of the reduction gear and having a pair of magnetized parts each having the shape of a semicircle, one of the magnetized parts being an N-pole, the other of the magnetized parts being a S-pole,
wherein the control circuit board is fixed to the gear housing cover of the speed reduction mechanism and has:
  an absolute position detecting device disposed so as to face the position magnet of the speed reduction mechanism and the absolute position detecting device adapted to detect a rotational position of the position magnet of the speed reduction mechanism, and to generate a position signal indicative of the rotational position of the output shaft of the worm wheel; and
  a plurality of field effect transistors disposed on a first surface of the control circuit board facing the gear housing cover, and adapted to drive the armature of the electric motor on the basis of the position signal generated by the absolute position detecting device,
wherein the gear housing is formed of metal by diecasting and has a heat dissipating member which includes a heat transfer material with high heat conductivity and is arranged between a second surface of the control circuit board opposite to the first surface of the control circuit board and an inner surface of the gear housing of the speed reduction mechanism, and
wherein the gear housing further includes a heat sink provided on an outer surface of the reduction gear accommodation portion thereof the heat sink being overlapped with the heat transfer material and the field effect transistors, whereby the heat transfer material of the heat dissipating member is configured for transferring the heat generated by the field effect transistors from the control circuit board to the heat sink.

9. The wiper motor according to claim 8, wherein
on the same side as the opening of the reduction gear accommodating part, FET heat dissipating parts are disposed on the opposite side of the worm wheel part with respect to the worm part.

10. The wiper motor according to claim 8, wherein
on the same side as the opening of the reduction gear accommodating part, the plurality of the field effect transistors is disposed approximately in parallel with the armature shaft.

11. The wiper motor according to claim 8, wherein
the gear housing has a heat dissipating platform formed so as to protrude from an inner surface thereof, and adapted to support FET heat dissipating parts.

12. The wiper motor according to claim 8, wherein
a first heat dissipating member is provided between the wall portion of the brush holder accommodating part and the first brush, and a second heat dissipating member is provided between the wall portion of the brush holder accommodating part and the second brush.

13. The wiper motor according to claim 8, wherein
the first brush and the second brush are disposed apart from the field effect transistors on the first surface of the control circuit board.

14. The wiper motor according to claim 8, wherein
the wiper motor is applied to a wiper apparatus for wiping a windshield of a vehicle.

15. A wiper motor with a speed reduction mechanism, comprising:
a reversible electric motor;
a speed reduction mechanism driven by the electric motor and having an output shaft; and
a control circuit board for controlling the electric motor, wherein the electric motor has:
  a cylindrical yoke;
  a four pole-magnet disposed on an inner surface of the yoke, different magnetic poles thereof being alternately arranged on the surface;
  an armature housed in the yoke and including: an armature shaft rotatably supported by the yoke and having a worm portion formed thereon; a commutator mounted on the armature shaft; a core mounted on the armature shaft and formed with a plurality of teeth; and a plurality of windings wound around the corresponding teeth of the core; and
  a brush holder unit having: a first brush and a second brush capable of making sliding contact with the commutator, the first and the second brushes being disposed so as to be spaced apart from each other at intervals of 90 degrees; and a pair of brush terminals respectively electrically connected to the first and the second brushes,
wherein the speed reduction mechanism has:
  a reduction gear having: a worm wheel engaged with the worm portion of the armature shaft of the electric motor; an output shaft integrally mounted at the rotation center of the worm wheel;
  a gear housing connected to the yoke of the electric motor and having: a brush holder accommodation portion in which the brush holder unit of the motor is accommodated, the brush holder accommodation portion having a wall formed with: a through hole through which the brush terminals of the brush holder unit of the electric motor are inserted; and a reduction gear accommodation portion integral with the brush holder accommodation portion and accommodating the reduction gear, the worm portion of the armature shaft of the electric motor, and the control circuit board;
  a gear housing cover adapted to cover the reduction gear accommodation portion; and
  a position magnet attached to a base end of the output shaft of the reduction gear and having a pair of magnetized parts each having the shape of a semicircle, one of the magnetized parts being an N-pole, the other of the magnetized parts being a S-pole,
wherein the control circuit board is fixed to the gear housing cover of the speed reduction mechanism and has:
  an absolute position detecting device disposed so as to face the position magnet of the speed reduction mechanism and the absolute position detecting device adapted to detect a rotational position of the position magnet of the speed reduction mechanism, and to generate a position signal indicative of the rotational position of the output shaft of the worm wheel; and
  a plurality of field effect transistors disposed on a first surface of the control circuit board facing the gear housing cover, and adapted to drive the armature of the electric motor on the basis of the position signal generated by the absolute position detecting device,
wherein the gear housing is formed of metal by die-casting and has a heat dissipating member which includes a heat transfer material with high heat conductivity and is arranged between a second surface of the control circuit board opposite to the first surface of the control circuit board and an inner surface of the gear housing of the speed reduction mechanism and adapted to transmit heat generated from the field effect transistors to the gear housing, and
wherein the gear housing further includes a heat sink provided on an outer surface of the reduction gear accommodation portion thereof the heat sink being overlapped with the heat transfer material and the field effect transistors.

16. The wiper motor according to claim 15, wherein on the same side as the opening of the reduction gear accommodating part, FET heat dissipating parts are disposed on the opposite side of the worm wheel part with respect to the worm part.

17. The wiper motor according to claim 15, wherein on the same side as the opening of the reduction gear accommodating part, the plurality of the field effect transistors is disposed along the rotational axis of the armature shaft.

18. The wiper motor according to claim 15, wherein the gear housing has a heat dissipating platform formed so as to protrude from an inner surface thereof, and adapted to support FET heat dissipating parts.

19. The wiper motor according to claim 15, wherein a first heat dissipating member is provided between the wall portion of the brush holder accommodating part and the first brush, and a second heat dissipating member is provided between the wall portion of the brush holder accommodating part and the second brush.

20. The wiper motor according to claim 15, wherein the first brush and the second brush are disposed apart from the field effect transistors on the first surface of the control circuit board.

* * * * *